(12) United States Patent
Hartono et al.

(10) Patent No.: US 8,783,041 B2
(45) Date of Patent: Jul. 22, 2014

(54) LNG TRANSPORT VESSEL AND METHOD FOR STORING AND MANAGING EXCESS BOIL OFF GAS THEREON

(75) Inventors: John Hartono, Oakland, CA (US); Paul Martella, The Woodlands, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 1019 days.

(21) Appl. No.: 12/797,092

(22) Filed: Jun. 9, 2010

(65) Prior Publication Data

US 2011/0302923 A1 Dec. 15, 2011

(51) Int. Cl.
*F02C 1/00* (2006.01)
*F02C 3/22* (2006.01)

(52) U.S. Cl.
USPC .......................................... 60/772; 60/39.465

(58) Field of Classification Search
USPC ........................... 60/39.463, 39.465, 780, 783
See application file for complete search history.

(56) References Cited

U.S. PATENT DOCUMENTS

| | | |
|---|---|---|
| 2004/0068993 A1 | 4/2004 | Irie et al. |
| 2006/0053806 A1 | 3/2006 | Tassel |
| 2007/0151988 A1 | 7/2007 | Saucedo et al. |

FOREIGN PATENT DOCUMENTS

| | | |
|---|---|---|
| EP | 1857727 A2 | 11/2007 |
| JP | 6033870 B2 | 5/1994 |

*Primary Examiner* — Phuttiwat Wongwian
*Assistant Examiner* — Scott Walthour
(74) *Attorney, Agent, or Firm* — Richard J. Schulte

(57) ABSTRACT

A liquefied natural gas (LNG) transport vessel for transporting liquefied natural gas (LNG) is disclosed which is capable of storing excess boil off gas BOG until needed for combustion in one or more combustion apparatus on the vessel. A method for managing the delivery of the BOG to the combustion apparatus is also described. The LNG vessel includes at least one insulated LNG storage tank which stores LNG. A first stage LNG receiver receives and stores BOG from the at least one LNG storage tank. A second stage or high pressure BOG storage tank receives compressed BOG from the receiver and stores the BOG as needed for combustion by one or more combustion apparatus of the vessel. A pressure regulator allows BOG gas to be delivered to the combustion apparatus if there is sufficient pressure in the high pressure storage tank to passively deliver the BOG at a predetermined delivery pressure. If the pressure in the high pressure BOG storage tank is insufficient to passively delivery the BOG to combustion apparatus, then a combustion apparatus compressor may be used to actively increase the pressure in BOG such that the BOG is delivered at the necessary delivery pressure. If there is still insufficient BOG in the high pressure BOG storage tank, then it may be necessary to supply supplemental auxiliary fuel to meet the needs of the combustion apparatus.

7 Claims, 2 Drawing Sheets

LNG TRANSPORT VESSEL AND METHOD FOR STORING AND MANAGING EXCESS BOIL OFF GAS THEREON

TECHNICAL FIELD

The present invention relates to systems and methods for combusting boil off gas on Liquefied Natural Gas (LNG) transport vessels.

BACKGROUND

During normal operations of a liquefied natural gas (LNG) carrier, LNG cargo being transported in LNG storage tanks boils off as gas, hereinafter referred to as "boil off gas (BOG)". This boil off is due, in part, to ambient heat ingress through the tank insulation. In addition, energy is imparted to the LNG by the dynamic motions of the vessel itself, again resulting in boil off.

Cargo tank pressures, and thus cargo temperatures, are managed during a sea going voyage by removing this BOG. Typically, this is done using the vessel's gas compressors and other machinery wherein the BOG is used as a fuel for propulsion and power generation. Due to external conditions, such as rough seas, the amount of BOG that has to be removed from the LNG storage tanks sometimes exceeds the requirements and capacity of the ship's machinery to use the BOG. In this case, the surplus energy in the BOG is typically removed overboard such as by a steam dump system, in the case of a steam propelled vessel, or by a Gas Combustion Unit (GCU) if the vessel is propelled by a dual fuel diesel electric (DFDE) drive.

Tassel, United States Patent Application No. 2006/00538806 describes the use of a system including a buffer tank to temporarily store BOG at low pressures, i.e. 20 to 30 psig, prior to combustion by prime movers. However, this particular system has a number of shortcomings.

First, only a single stage BOG buffer tank is utilized to store BOG. Second, the pressure in BOG downstream from the buffer tank cannot be increased if necessary to meet delivery pressure requirements of equipment used to combust the BOG. The pressure in the system is maximum in the single stage BOG buffer tank and no accommodation is made for further increasing the pressure of the BOG other than pumping additional BOG into the BOG buffer tank to increase pressure.

With current concerns relating to environmental impacts of any type of emissions on the environment, it is desirable to have a more efficient method of using and storing BOG than is conventionally employed by LNG transport vessels.

SUMMARY OF THE DISCLOSURE

A method for combusting boil off gas (BOG) on a liquefied natural gas (LNG) transport vessel is disclosed. LNG gas is stored in at least one insulated LNG storage tank on a LNG transport vessel. Evaporated BOG is captured from the at least one LNG storage tank and is compressed and stored in a high pressure BOG storage tank. The BOG is delivered at a calculated delivery pressure to a combustion apparatus where the BOG is combusted.

If the pressure of the BOG in the high pressure BOG storage tank is insufficient to passively deliver the BOG to the combustion apparatus at the calculated delivery pressure, then the BOG from the high pressure BOG storage tank is compressed such that the BOG is delivered at the calculated delivery pressure. Alternatively, if the pressure of the BOG in the high pressure BOG storage tank is sufficiently high, then the BOG is delivered to the combustion apparatus through a passive pressure regulator without further compressing the BOG from the BOG storage tank.

An auxiliary fuel may be delivered to the combustion apparatus. The auxiliary fuel may be delivered in place of, or as a supplement to, the BOG delivered from the high pressure BOG storage tank to the combustion apparatus. This generally occurs when there is insufficient BOG in the high pressure BOG storage tank to meet all the needs of the combustion apparatus.

The combustion apparatus may include a gas combustion unit (GCU) such as is used with a dual fuel diesel electric (DFDE) drive. Alternatively, the combustion apparatus may include a steam or marine boiler for producing steam to drive a turbine. Another possibility is a gas turbine. Other types of combustion apparatus used for propulsion or power generation may also be used as is well known to those skilled in the art of marine or ship engineering.

The BOG captured from the at least one LNG storage tank may be compressed and first stored in a first stage BOG storage tank or BOG receiver. Then the BOG from the first stage BOG receiver is further compressed and stored in the high pressure or second stage BOG storage tank.

A liquefied natural gas (LNG) transport vessel for transporting liquefied natural gas (LNG) is also disclosed. The LNG vessel includes at least one LNG storage tank for storing liquefied natural gas, a high pressure BOG storage tank for storing BOG received from the LNG storage tank, a combustion apparatus which receives BOG from the high pressure BOG storage tank and a combustion apparatus compressor located downstream from high pressure BOG storage tank for actively compressing and delivering BOG to the combustion apparatus at a calculated delivery pressure.

A pressure regulator for passively delivering BOG from the high pressure BOG storage tank to the first combustion apparatus is included. The BOG may be passively delivered to the combustion apparatus if the pressure in the BOG high pressure storage tank is sufficient to deliver the BOG at the calculated delivery pressure without requiring further compression by the compression apparatus compressor.

A BOG receiver or storage tank may also be used which receives BOG from the at least one LNG storage tank. A booster gas compressor may be used to compress BOG from the BOG receiver and deliver the BOG to the high pressure BOG storage tank.

An auxiliary fuel system in fluid communication with the combustion apparatus may be used to store an auxiliary fuel to supplement or replace the BOG delivered from the high pressure BOG storage tank. Also, additional combustion apparatus can be used which receive BOG from the high pressure BOG storage tank and this invention is not limited to a single combustion apparatus.

A pressure sensor and controller is included which controls when the BOG is passively delivered by way of the pressure regulator or actively delivered using a combustion apparatus compressor to the combustion apparatus from the high pressure BOG storage tank.

A method for controlling the delivery of BOG from a high pressure BOG storage tank to a combustion apparatus on a liquefied natural gas (LNG) transport is also described. A first step includes sensing when there is sufficient pressure in a high pressure BOG storage tank to passively deliver BOG to the combustion apparatus at a calculated delivery pressure and when BOG needs to be further actively compressed to achieve the calculated delivery pressure to deliver the BOG to the combustion apparatus. A second step includes modulating a passive pressure regulator and a combustion apparatus compressor to deliver BOG to the combustion apparatus in response to the sensed pressure in the BOG storage tank.

BRIEF DESCRIPTION OF THE DRAWINGS

These and other objects, features and advantages of the present invention will become better understood with regard to the following description, pending claims and accompanying drawings where:

DETAILED DESCRIPTION

Figure 1:
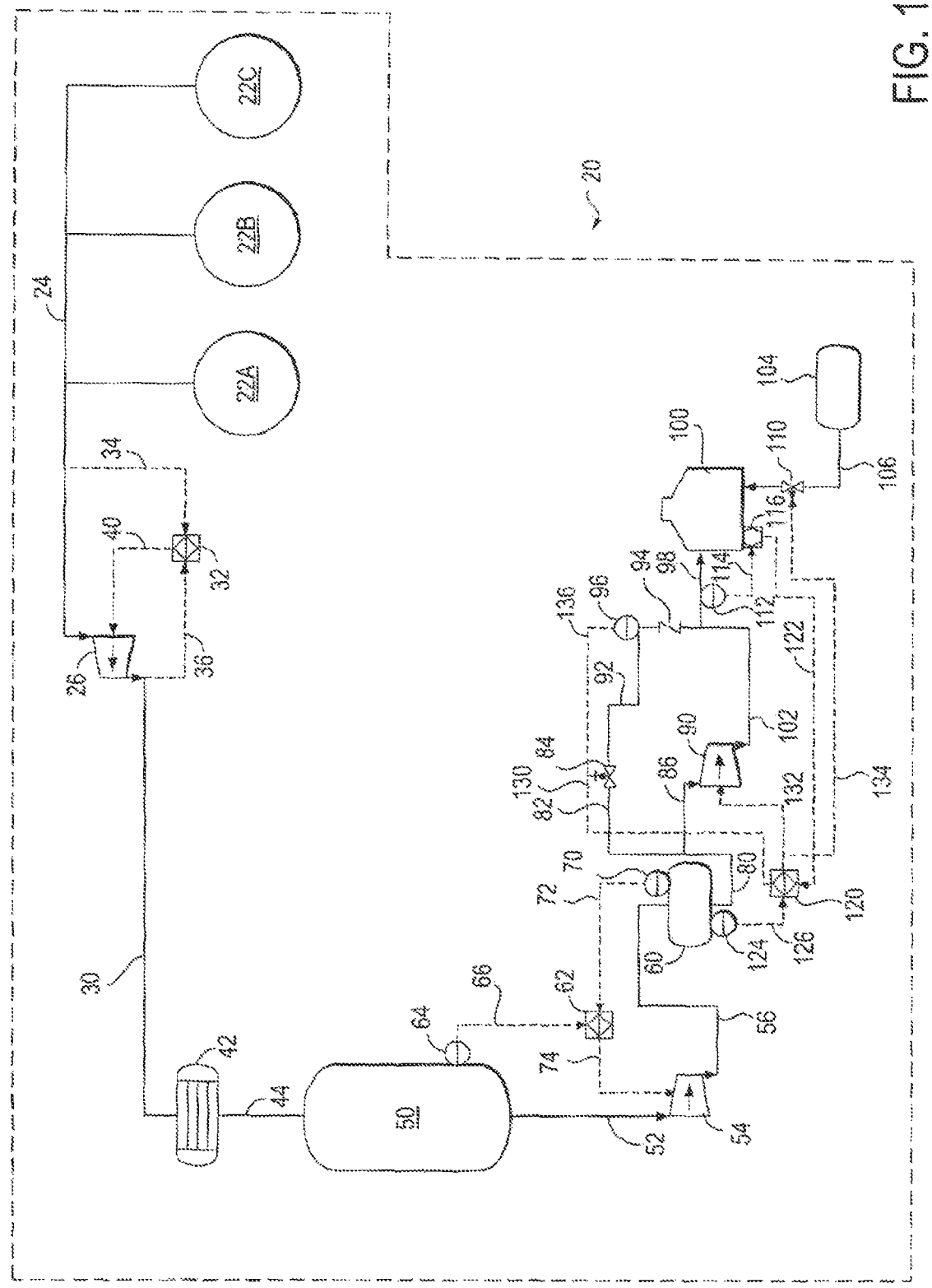
FIG. 1 is a schematic diagram of an LNG vessel wherein excess BOG received from LNG cargo tanks is stored in first and second stage BOG storage tanks utilizing a control scheme to deliver BOG at a calculated delivery pressure to one or more combustion apparatus, either passively through a pressure regulator or actively using a combustion apparatus compressor.

FIG. 1 is a schematic drawing of one embodiment of an LNG transport vessel and a method for managing BOG on the vessel. First and second stage BOG storage tanks allow flexibility in storing BOG received from LNG storage tanks and delivered to one or more combustion apparatus. BOG from the first stage BOG storage tank is compressed by a booster compressor and supplies BOG to the second stage BOG storage tank.

The first stage storage tank receives and stores BOG at a relatively low pressure and accommodates pressure requirements in the LNG storage tanks such that pressure in the LNG storage tanks does not get too high or too low. The pressure of the BOG in the LNG storage tank should not get below atmospheric pressure or about 14.7 psi. Similarly, the pressure in the LNG storage tank should not get so great as to overly stress the strength capacity of the LNG storage tanks or allow the temperature in the LNG to rise about a predetermined temperature.

The second stage BOG storage tank generally operates at a significantly higher pressure than the BOG receiver such that, under normal operating conditions, BOG can be passively discharged through a pressure regulator to deliver BOG to the combustion apparatus at a calculated delivery pressure. This calculated delivery pressure will, of course, depend on the particular type of combustion apparatus being employed and the particular level of load the combustion apparatus is under. More load requires more BOG be delivered to the combustion apparatus and the calculated delivery pressure will accordingly be greater. The combustion apparatus compressor is generally maintained in a running mode but does not significantly energize and compress the BOG if the BOG can be passively delivered to the combustion apparatus. This limits the power requirements of the combustion apparatus compressor when active compression of the BOG is not required to achieve the calculated delivery pressure.

If the pressure in the second stage BOG storage tank falls below the calculated delivery pressure, then a combustion apparatus compressor can be modulated to increase the pressure in the BOG to the calculated delivery pressure. If the pressure in the high pressure BOG storage tank drops too low to adequately supply sufficient BOG at the calculated delivery pressure, even with the assistance of the combustion apparatus compressor, then an auxiliary fuel system is activated to supplement or completely supply the fuel needs of the combustion apparatus. As a non-limiting example, the auxiliary or liquid marine fuel may be diesel or bunker fuel.

FIG. 1 shows one embodiment, made in accordance with the present invention, of a liquefied natural gas (LNG) transport vessel 20 for transporting LNG across a body of water such as an ocean or sea. LNG is loaded and stored within insulated LNG cargo tanks 22A, 22B and 22C. A portion of the LNG stored in tanks 22 evaporates and forms boil off gas (BOG). Evaporation occurs as energy is absorbed by the LNG such as by way of heat conduction through insulation (not shown) surrounding cargo tanks 22. Alternatively, kinetic energy from the movement of LNG within the cargo tanks may be changed into thermal energy causing a portion of the LNG to gasify into BOG. This occurs particularly during travel of vessel 20 through rough seas.

The pressure within LNG storage tanks 22 increases as the amount of LNG boils off or evaporates forming the BOG. BOG from the cargo tanks 22 is removed to assist in maintaining the LNG in the cargo tanks 22 at a low temperature and to prevent over pressurization in LNG storage tanks 22. A low-pressure header or conduit 24 conveys BOG to a gas compressor 26 which compresses and delivers a higher pressure BOG into an output gas conduit 30. The pressure of BOG input into compressor 26 is typically on the order of about 15 psi, slightly above atmospheric pressure. The pressure in LNG tanks 22 should not be allowed to drop below atmospheric pressure or about 14.7 psi. Similarly, the pressure in LNG tanks 22 should not be allowed to go above design pressures for LNG tank 22 based upon strength criteria of the LNG storage tanks.

A programmable logic controller 32 or other control device may be used to control the speed or operation of compressor 26. An input line 34 may carry a signal indicative of the pressure in header 24 to PLC 32. Alternatively, an input line 36 may carry a signal indicative of the pressure in output gas conduit 30 to PLC 32. PLC 32 then provides an output signal through output line 40 to control the speed or operation of compressor 26. Compressors used in FIG. 1 are generally centrifugal compressors; however, other types of compressors may also be utilized.

The output BOG is transported by gas conduit 30 through a heat exchanger 42 to increase the temperature in the BOG. Typically the temperature of the BOG output from heat exchanger 42 would be approximately ambient temperature or about 75 F. A gas conduit 44 delivers BOG to a first stage or low pressure BOG storage tank or receiver 50. As the BOG has been heated by heat exchanger 42, storage tank 50 can be a conventional or non-cryogenic storage tank.

A gas conduit 52 connects with the input to a booster gas compressor 54 that increases the pressure in the BOG output from booster gas compressor 54. An output gas conduit 56 delivers this enhanced pressure BOG to a second stage or high pressure BOG storage tank 60. Ideally, the pressure in high pressure BOG storage tank 60 will be somewhat above the desired calculated delivery pressure to a combustion apparatus 100. By way of example and not limitation, the pressure may be 10-20 psi above the calculated delivery pressure. It is not desirable to force booster gas compressor 54 to work overly hard to greatly pressure the BOG above the calculated delivery pressure.

In this particular embodiment, a programmable logic controller (PLC) 62, or other type of controller, controls the speed or operation of compressor 54. A pressure sensor 64 senses the pressure of BOG in receiver 50 and inputs a signal indicative of this pressure through an input line 66 to PLC 62. Also, a pressure sensor 70 senses the pressure in high pressure BOG storage tank 60 and supplies an appropriate signal through an input line 72 to PLC 62. PLC 62 then determines the speed or operation of booster compressor 52 necessary to compress BOG to move the pressure in high pressure BOG storage tank 60 towards a desired calculated pressure. As will be described later in more detail, this desired pressure will be dependent on the calculated delivery pressure of the BOG which is to be delivered to a combustion apparatus 100 used to combust the BOG. An appropriate control signal is sent through an output line 74 to compressor 54.

BOG is output from high pressure BOG storage tank 60 through a gas conduit 80. A first gas conduit 82 receives BOG from gas conduit 80 and delivers BOG to a pressure regulator 84. Pressure regulator 84 generally opens and closes a valve and controls the pressure of BOG exiting pressure regulator 84. BOG from gas conduit 80 is also delivered to a gas conduit 86 which delivers BOG to a combustion apparatus compressor 90 which can be used to increase the pressure of the BOG delivered from high pressure BOG storage tank 60.

From pressure regulator 84, BOG can be passed through a gas conduit 92, which includes a one-way check valve 94 which prevents back flow of BOG to pressure regulator 84. A pressure sensor 96 determines the pressure in gas conduit 92. BOG is then delivered through a gas conduit 98 to combustion apparatus 100 which combusts the BOG delivered from the high pressure BOG storage tank 60. Alternatively, BOG increased in pressure through the use of combustion apparatus compressor 90 can pass through a gas conduit 102 to gas conduit 98 for delivery to combustion apparatus 100.

Combustion apparatus 100 used to combust BOG can be any of a number of different combustion apparatus used to generate power or propulsion to the vessel 20. In this particular embodiment, the combustion apparatus is a Gas Combustion Unit (GCU) used by a dual fuel diesel electric (DFDE) drive. By way of example, and not limitation, gas combustion apparatus 100 could also be a steam boiler or a gas turbine. While a single combustion apparatus has been referred to, it is within the scope of this invention to use multiple combustion apparatus to combust the BOG. Each of these combustion apparatus may have similar or different calculated delivery pressures depending on the particular type of combustion apparatus employed and under what load condition each combustion apparatus is operating. Appropriate use of pressure regulator valves, controllers and compressors can be used to achieve the calculated delivery pressure for each combustion apparatus.

In the event insufficient BOG can be delivered to combustion apparatus 100, an auxiliary fuel assembly 104 can be used to deliver an auxiliary fuel or liquid marine fuel to combustion apparatus 100. Conduit 106 brings fuel from auxiliary fuel assembly 104 to a control valve 110. Control valve 110 is used to control the flow of auxiliary fuel to combustion apparatus 100.

A pressure sensor 112 senses and delivers an appropriate signal through an input line 114 to a computer 116 which calculates the appropriate delivery pressure that should be delivered to combustion apparatus 100. Computer 116 generally has a myriad of inputs to consider in determining the calculated delivery pressure. Such inputs might include the power demand on the combustion apparatus, engine temperatures, lube oil pressures, combustion air temperatures and pressures, and many other inputs. Only the input from pressure sensor 112 is shown in FIG. 1. Those skilled in the art of instrumentation will be well versed in how to program computer 116 and what inputs are desirable to determine an optimal or calculated delivery pressure to combustion apparatus 100 under the current operating conditions of vessel 20.

A programmable logic controller 120 receives a signal indicative of the desired delivery pressure of the BOG to combustion apparatus 100 through an input line 122 from computer 116. Also, a pressure sensor 124 senses the pressure in high pressure storage tank 60 and delivers a signal indicative of the pressure through an input line 126 to PLC 120. PLC 120 then outputs a number of control signals through output lines 130, 132 and 134, respectively, to pressure regulator 84, combustion apparatus compressor 90 and fuel control valve 110.

Figure 2:
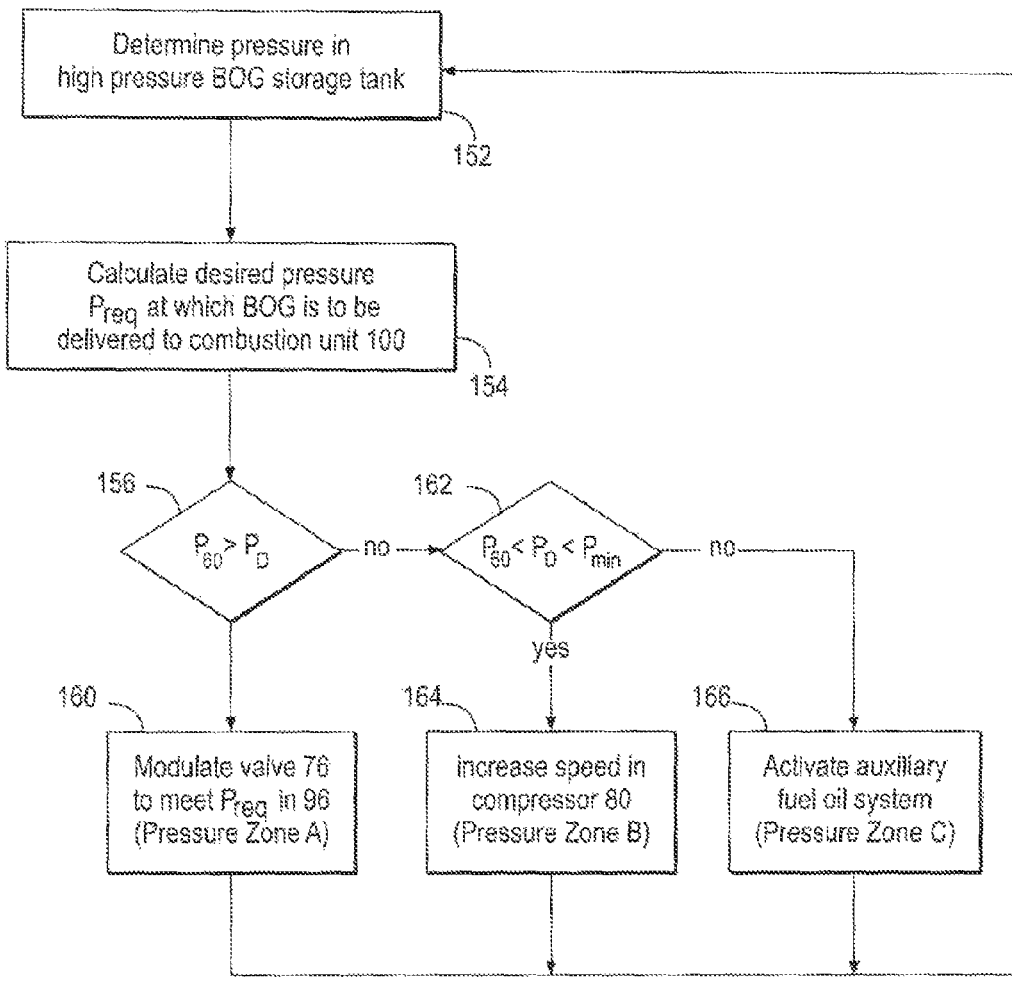
FIG. 2 is a schematic drawing of a control scheme for modulating a pressure regulator, a combustion apparatus compressor and an auxiliary fuel system located downstream from a second stage BOG storage tank such that sufficient BOG and/or auxiliary fuel is delivered to meet the needs of the combustion apparatus combusting BOG and auxiliary fuel.

FIG. 2 describes the logic used by PLC 120. The pressure $P_{60}$ in the second stage or high pressure BOG storage tank 60 is sensed in a step 152. Computer 116 uses this sensed pressure $P_{60}$, in conjunction with the myriad of other inputs provided to computer 116, to calculate an optimal or calculated delivery pressure $P_D$ to combustion apparatus 100 in a step 154.

If the pressure $P_{60}$ in storage tank 60 is above the calculated delivery pressure $P_D$, i.e., $P_{60}$ is greater than $P_D$, in step 156, then pressure regulator 84 is modulated in step 160 to allow the BOG to passively flow to combustion apparatus 100. Pressure regular 84 adjusts the opening of a valve to control the pressure in gas conduit 92. Pressure regulator 84 responds to the signal from PLC 120 as to what the desired delivery pressure $P_D$ should be in gas conduit 92 at that point in time and to what is the actual pressure in conduit 92. A signal is sent through an input line 136 from pressure sensor 96 to pressure regulator 84 to provide the actual pressure information. When BOG is being passively supplied though pressure regulator 84 to combustion apparatus 100, combustion apparatus compressor continues to run in a generally idled state. Hence, only an insignificant amount of BOG is supplied from combustion apparatus compressor 90 to combustion apparatus 100. This minimizes the power which needs to be delivered to compressor 90 when BOG is supplied through pressure regulator 84.

If in a step 162 the pressure $P_{60}$ in storage tank 60 is below the calculated delivery pressure $P_D$ but above a predetermined minimum pressure $P_{min}$, $P_D$ greater than $P_{60}$ greater than $P_{min}$, then a signal is sent in step 164 by PLC 120 to actively modulate combustion apparatus compressor 90 to increase the pressure in the BOG such that the BOG is delivered at the desired delivery pressure $P_D$ to combustion apparatus 100.

If there is insufficient pressure $P_{60}$ in storage tank 60, i.e., $P_{60}$ less than a $P_{min}$, then there is not enough BOG in high pressure storage tank 60 to adequately supply combustion apparatus 100 with BOG, even with the use of combustion apparatus compressor 90. PLC 120 will then modulate in step 166 the fuel delivery valve 110 as needed to make sure sufficient auxiliary fuel is supplied to combustion apparatus 100 to meet the heating or power needs of combustion apparatus 100. This auxiliary fuel may supplement the BOG being supplied to combustion apparatus 100 or else may completely replace BOG as fuel allowing high pressure BOG storage tank 60 to be replenished with BOG at appropriate pressures.

This assumes adequate supplies of BOG are available from first stage storage tank or receiver 50.

As is conventionally done currently, it is also possible to divert a portion of LNG from LNG tanks 22, warm the diverted LNG to produce BOG, and use this BOG to provide fuel to combustion apparatus 100. The use of this heated and evaporated LNG allows less auxiliary fuel to be used if insufficient BOG is generated under normal operating conditions of vessel 20. Typically, the auxiliary or liquid marine fuel is more expensive and valuable than the LNG being transported.

Figure 3:
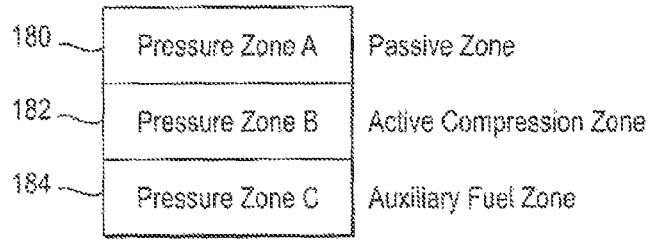
FIG. 3 is a diagram indicating that the pressure at which the second stage BOG storage tank is operating will control whether BOG is generally passively delivered by a pressure regulator, or is actively delivered by a combustion apparatus compressor, to a combustion apparatus. Also, if there is insufficient BOG available in the second stage BOG storage tank to meet the fuel needs of the combustion apparatus, then auxiliary fuel is delivered to the combustion apparatus to supplement or replace the BOG.

FIG. 3 indicates the different zones of operation for LNG transport vessel 20, depending on the sensed pressure $P_{60}$ in the high pressure BOG storage tank 60. If the pressure is sufficiently high in pressure zone A, designated as 180, i.e., above the calculated desired delivery pressure $P_D$, then BOG can be allowed to passively pass through pressure regulator 84 and minimal energy need be expended running combustion apparatus compressor 90. However, if the pressure in storage tank is not sufficiently high, i.e. in a pressure zone B, designated as 182, then additional energy and pressure can be actively added to the BOG by modulating combustion apparatus compressor 90 so that the BOG can be delivered to combustion apparatus 100 at the desired delivery pressure $P_D$ without the need to use the expensive auxiliary fuel. However, if high pressure BOG storage tank 60 becomes too depleted of BOG, i.e., zone C, designated as 184, then some or all of the requirements of fuel to combustion apparatus 100 may be supplied by auxiliary fuel system 104.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

For example, many alternative sensed pressure parameters and combinations of PLC may be used to manage the flow of BOG. As one such alternative embodiment, auxiliary fuel system 104 could be activated by a separate programmable logic controller whenever the pressure in high pressure BOG storage tank 60 drops below a minimum $P_{min}$ without the utilizing PLC 90 to control auxiliary fuel valve 110.

What is claimed is:

1. A method for combusting boil off gas (BOG) on a liquefied natural gas (LNG) transport vessel, the method comprising the steps of:
    storing LNG in at least one insulated LNG storage tank on a LNG transport vessel;
    capturing evaporated BOG from the at least one LNG storage tank and compressing and storing the BOG in a high pressure BOG storage tank;
    delivering the BOG at a calculated delivery pressure to a first combustion apparatus where the BOG is combusted;
    wherein when the pressure of the BOG in the high pressure BOG storage tank is insufficient to passively deliver the BOG to the first combustion apparatus at the calculated delivery pressure, then BOG from the high pressure BOG storage tank is compressed downstream from the high pressure BOG storage tank such that the BOG is delivered at the calculated delivery pressure.

2. The method of claim 1 wherein:
    when the pressure of the BOG in the high pressure BOG storage tank is sufficiently high, then the BOG is delivered to the first combustion apparatus through a passive pressure regulator without need to further compress the BOG from the high pressure BOG storage tank.

3. The method of claim 1 further comprising:
    delivering an auxiliary fuel to the first combustion apparatus.

4. The method of claim 1 wherein:
    the first combustion apparatus includes a steam boiler for producing steam to drive a steam turbine.

5. The method of claim 1 wherein:
    the first combustion apparatus includes a dual fuel diesel engine.

6. The method of claim 1 wherein:
    the first combustion apparatus includes a gas turbine.

7. The method of claim 1 wherein:
    the BOG is captured from the at least one LNG storage tank and is compressed and stored in a first stage gas storage tank; and
    the BOG from the first stage gas storage tank is further compressed and stored in a second stage storage tank which serves as the high pressure BOG storage tank.

* * * * *